United States Patent [19]
Augustinus

[11] Patent Number: 6,128,491
[45] Date of Patent: Oct. 3, 2000

[54] METHOD AND SYSTEM FOR SELECTING CONTROL CHANNELS FROM BASE STATIONS LOCATED NEAR A BORDER BETWEEN RADIO TELECOMMUNICATIONS NETWORKS

[75] Inventor: Greg Augustinus, North Melbourne, Australia

[73] Assignee: Telefonaktiebolaget LM Ericsson (publ), Stockholm, Sweden

[21] Appl. No.: 09/021,911

[22] Filed: Feb. 11, 1998

[51] Int. Cl.[7] ...................................................... H04Q 7/38
[52] U.S. Cl. ........................ 455/434; 455/443; 455/445; 455/515
[58] Field of Search ..................... 455/434, 443, 455/445, 450, 509, 510, 512, 514, 515, 516, 410, 444, 411; 370/329, 330

[56] References Cited

U.S. PATENT DOCUMENTS

| | | | |
|---|---|---|---|
| 4,905,301 | 2/1990 | Krolopp et al. | 455/34 |
| 5,251,249 | 10/1993 | Allen et al. | 379/59 |
| 5,255,307 | 10/1993 | Mizikovky | 455/432 |
| 5,561,845 | 10/1996 | Bendixen et al. | 455/443 |

FOREIGN PATENT DOCUMENTS 0 505 106 A2  9/1992  European Pat. Off. .

*Primary Examiner*—Lee Nguyen
*Attorney, Agent, or Firm*—Smith & Danamraj, P.C.

[57] ABSTRACT

A method and system for selecting control channels from base stations located near a border between radio telecommunications networks. The system includes a first mobile switching center (MSC) that services and controls a coverage area associated with a first radio telecommunications network, a plurality of base stations located within the first radio telecommunications network, and a plurality of base stations located within the second radio telecommunications network. Additionally, the system includes redirection logic located within the first MSC which determines if a mobile station (MS) from the second radio telecommunications network is attempting to access a base station in the first radio telecommunications network which is adjacent to the border between the first and second radio telecommunications networks and redirects the MS to access a control channel from a base station located within the second radio telecommunications network. The system may also include a second MSC with redirection logic for redirecting mobile stations to their home radio telecommunications network.

20 Claims, 3 Drawing Sheets

METHOD AND SYSTEM FOR SELECTING CONTROL CHANNELS FROM BASE STATIONS LOCATED NEAR A BORDER BETWEEN RADIO TELECOMMUNICATIONS NETWORKS

BACKGROUND OF THE INVENTION

1. Technical Field of the Invention

This invention relates to radio telecommunication systems and, more particularly, to a method and system for selecting control channels from base stations located near a border between radio telecommunications networks.

2. Description of Related Art

In a radio telecommunications network, when a mobile station (MS) originates a call, the MS scans for a control channel with the strongest signal. When an MS is operating along a border where two radio telecommunications networks having different network operators are adjacently located, the MS may access an analog control channel from a base station in a neighboring network rather than from the network in which the MS is operating. For example, an MS operating near a border within its home network may receive a stronger signal from a base station located across the border in a neighboring network and may access the neighboring network as a result.

Several problems arise when the MS accesses a control channel from a different operator. First, the MS is charged by a different network operator, rather than his home network operator. Second, higher rates, such as roaming charges, may result. Additionally, the home network operator loses revenue to which it is rightfully entitled since the MS is still operating within the coverage area of the MS's home network. The MS may also lose the ability to access features found in its home network.

Another serious problem arises when mobile stations operate along the border of two competing networks. In an attempt to recover lost revenue, network operators currently boost the transmitter power from their base stations in order to "capture" mobile stations operating along the border. Increasing the power of a base station in one network can lead to the bordering network operator boosting power from its base stations, literally causing a "power war" between the border base stations. The elevation of transmitter power at the border base stations leads to increased mutual radio interference along the border, decreasing the performance of both networks.

It would be advantageous to have a system and method which prevents mobile stations operating within their home network near a border with a neighboring network, from accessing analog control channels from the neighboring network. Although there are no known prior art teachings of a solution to the aforementioned deficiency and shortcoming such as that disclosed herein, a prior art reference that discusses subject matter that bears some relation to matters discussed herein is U.S. Pat. No. 4,905,301 to Krolopp et al. (Krolopp).

Krolopp discloses a mobile telephone which compares a system identification transmitted on a control channel of a desired network and the system identification transmitted on an access channel during the access process of the mobile telephone. Access is permitted only if the control channel system identification and the access channel system identification match.

Krolopp does not teach or suggest a system or method for correctly selecting control channels of base stations located near a border between radio telecommunications networks. Krolopp merely discloses a mobile telephone which compares a proposed control channel's system identification with a system identification obtained during initialization of the mobile telephone. Although Krolopp may be utilized to restrict a mobile telephone to operating on selected control channels, it suffers from several disadvantages. The mobile telephone must be modified to compare system identifications. Additionally, if the mobile telephone is turned on in a coverage area where an adjacent network's control channels have the strongest signal, the mobile telephone will access the adjacent network's control channel, since the preferred system identification is established when the mobile telephone is turned on. In fact, if the mobile telephone is turned on in the adjacent network, the mobile telephone will only allow access to control channels with a system identification associated with the adjacent network, even if the mobile telephone returns to the home network. Therefore, Krolopp only solves the problems of a mobile station transiting near a border when the mobile station is first powered on in its home network. Additionally, if the mobile telephone in Krolopp is actually located in the adjacent network, the mobile telephone will deny access for the strongest control channels, thereby losing revenue for the adjacent network operator which has a rightful claim on the lost revenue.

Thus, it would be a distinct advantage to have a system and method which prevents mobile stations operating within its home network along a border, from erroneously accessing analog control channels from another network with a different operator.

SUMMARY OF THE INVENTION

In one aspect, the present invention is a system for selecting a control channel for a mobile station (MS) operating near a border between a first radio telecommunications network and a second radio telecommunications network. The system includes a first mobile switching center (MSC) that services and controls an area associated with the first radio telecommunications network, a first plurality of base stations located within the first radio telecommunications network, and a second plurality of base stations located within the second radio telecommunications network. Additionally, the system includes means for determining whether the MS is attempting to access a control channel from a base station in the first plurality of base stations, and means for redirecting the MS to access a control channel from a base station in the second plurality of base stations.

In another aspect, the present invention is a method of selecting a control channel for a MS operating within a first radio telecommunications network along a border between a first radio telecommunications network and a second radio telecommunications network. The first radio telecommunications network includes a first mobile switching center (MSC) and a first plurality of base stations. Additionally, the second radio telecommunications network includes a second MSC and a second plurality of base stations. The method first starts with the second MSC determining if the MS is attempting to access a control channel from a base station of the second plurality of base stations. Next, the second MSC redirects the MS to access a control channel from a base station in the first plurality of base stations, upon determining that the MS is attempting to access a control channel from a base station in the second plurality of base stations.

In another aspect, the present invention is a method of selecting a control channel for a MS operating within a first radio telecommunications network along a border between the first radio telecommunications network and a second radio telecommunications network. The first radio telecommunications network includes a first mobile switching center (MSC) and a first plurality of base stations. Additionally, the second radio telecommunications network includes a second MSC and a second plurality of base stations. First, the MS attempts to access a first control channel from one of the second plurality of base stations. Next, the second MSC determines whether the MS is associated with the first radio telecommunications network. The second MSC then determines whether the first control channel is associated with a border base station which is adjacent to the border between the first radio telecommunications network and the second radio telecommunications network, upon determining that the MS is associated with the first radio telecommunications network. The second MSC then selects a list of alternate control channels upon determining that the first control channel is associated with a border base station. The list includes control channels from border base stations in the first radio telecommunications network and control channels from base stations in the second radio telecommunications network which are not border base stations. Next, the second MSC sends a redirect message to the MS. The redirect message includes the list of alternate control channels and directs the MS to attempt to access one of the alternate control channels on the list.

In still another aspect, the present invention is a system for selecting a control channel for a MS operating near a border between a first radio telecommunications network and a second radio telecommunications network. The system includes a MSC that services and controls a coverage area associated with the first radio telecommunications network, a first plurality of base stations located within the first radio telecommunications network, a second plurality of base stations located within the second radio telecommunications network, and means for storing a list of directory numbers associated with mobile stations having the second radio telecommunications network as their home network. The system also includes means for determining whether the MS is attempting to access a base station which is adjacent to the border between the first radio telecommunications network and the second radio telecommunications network in the first plurality of base station, means for determining a plurality of alternate control channels from the second plurality of base stations, and means for redirecting the MS to access a control channel from the plurality of alternate control channels.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method for selecting control channels near a border between two radio telecommunications networks.

Figure 1:
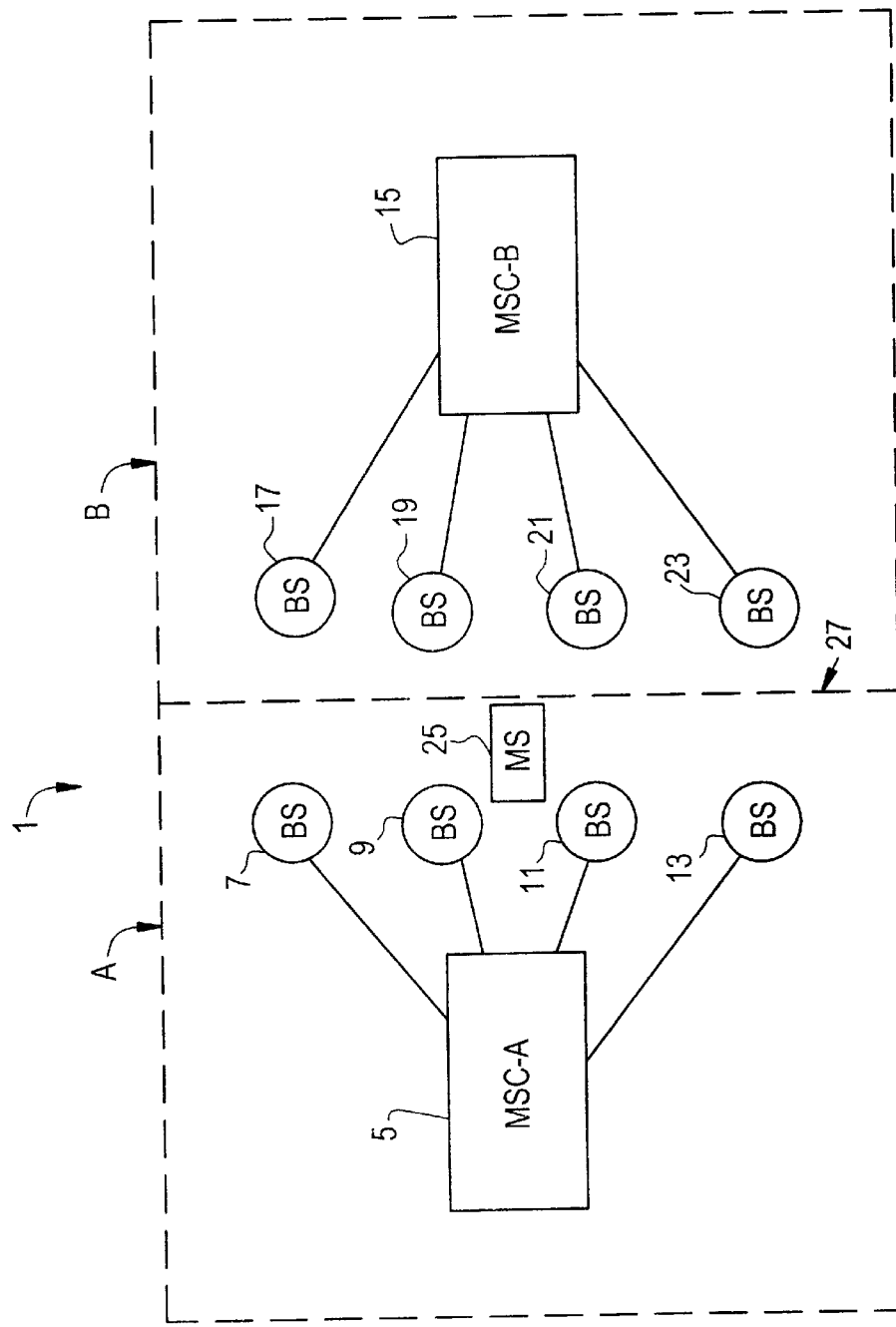
FIG. 1 (Prior Art) is a simplified block diagram illustrating the components of an existing radio telecommunications system for a mobile station located near a border between two networks serviced by different operators.

FIG. 1 is a simplified block diagram illustrating the components of an existing radio telecommunications system 1 for a mobile station (MS) 25 located near a border 27 between two analog cellular networks serviced by different operators. The radio telecommunications system 1 includes a Network A having a mobile switching center-A (MSC-A) 5 which serves base stations (BS) 7–13. The existing radio telecommunications system 1 also includes a Network B having a mobile switching center-B (MSC-B) 15 which serves BSs 17–23. The MS 25 operates within the radio telecommunications system 1 and the border 27 separates Network A from Network B. It should be understood that in actual practice, there may be many more base stations in each network, but for illustrative purposes, only a few border base stations have been shown.

The MS 25 is a mobile station whose "home" network is Network A. The MSC-A typically serves the MS 25 when the MS 25 is within Network A's coverage area. When MS 25 originates a call, it scans for a control channel with the strongest signal. Once the MS 25 determines which base station has the strongest signal, it accesses the control channel in order to establish a call.

However problems arise when the MS 25 operates near the border 27. While the MS 25 operates near the border 27, the MS 25 may detect the strongest signal strength from one of Network B's base stations 17–23, and access a control channel from neighboring Network B. For example, if MS 25 is still physically located as shown within the coverage area of Network A, yet near the border 27, it may access a control channel associated with one of the closest base stations 19 or 21 located in Network B. This results in MS 25 incurring additional fees for accessing a different network and incorrectly taking away revenue from Network A. In order to retain the revenue generated from MS 25, each network operator increases the transmitter power of its border base stations in order to "capture" MS 25.

Figure 2:
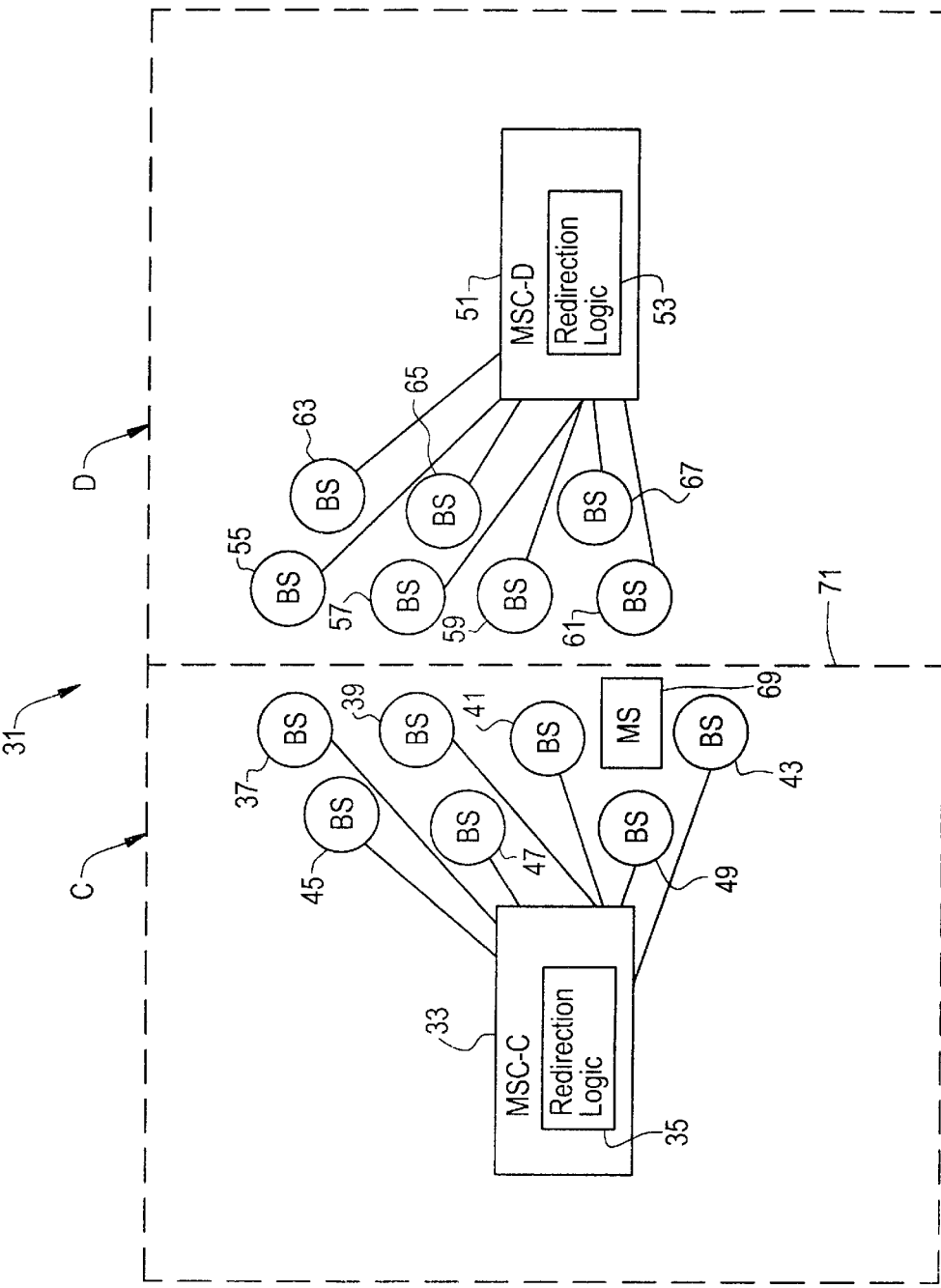
FIG. 2 is a simplified block diagram illustrating the components of a radio telecommunications system for a mobile station located near a border between two networks serviced by different operators in a preferred embodiment of the present invention.

FIG. 2 is a simplified block diagram illustrating the components of a radio telecommunications system 31 for a mobile station (MS) 69 located near a border 71 between two analog cellular networks serviced by different operators in a preferred embodiment of the present invention. The radio telecommunications system 31 includes a Network C having a mobile switching center-C (MSC-C) 33 with redirection logic 35, and base stations (BS) 37–49. Additionally, the radio telecommunications system 31 includes a Network D having a mobile switching center-D (MSC-D) 51 with redirection logic 53, and BSs 55–67. The MS 69 operates within the radio telecommunications system 31, and the border 71 separates Network C from Network D. It should be understood that in actual practice, there may be many more base stations in each network, but for illustrative purposes, only a few border base stations have been shown.

The base stations 37–43 are all located near the border 71 and are designated border base stations. The base stations 45–49 are neighboring base stations to the border base stations, but are located further within the coverage area of Network C. Within the MSC-C, the redirection logic 35 includes a database containing flagged directory numbers used by mobile stations whose home network is Network D. The list of flagged directory numbers may be indicated by a prefix found at the beginning of a mobile station's telephone number. For example, a mobile station, which is associated with Network D, may have a number such as 555-1313. The prefix, "555", may be an indicator that the mobile station is associated with Network D. The MSC-C would store the "555" prefix as an indicator for determining a flagged directory number.

In addition to storing the flagged directory numbers, the redirection logic 35 determines when a mobile station, such as MS 69, having a flagged directory number is attempting to access a control channel associated with one of Network C's border base stations 37–43. When the redirection logic 35 determines this, the redirection logic 35 sends a redirect message to the MS 69 denying access to the requested control channel and redirecting the MS 69 to attempt access on a different control channel.

Within Network D is the MSC-D 51, which has control of the BSs 55–67. The base stations 55–61 are all located near the border 71 and are designated border base stations. The base stations 63–67 are neighboring base stations to the border base stations, but are located further within the coverage area of Network D. Within the MSC-D, the redirection logic 53 includes a database containing flagged directory numbers used by mobile stations whose home network is Network C. The list of flagged directory numbers may be indicated by a prefix found at the beginning of a mobile station's telephone number as described above.

In addition to storing the flagged directory numbers, the redirection logic 53 determines when a mobile station having a flagged directory number, is attempting access to a control channel associated with one of Network D's border base stations 55–61. When the redirection logic 53 determines this, the redirection logic 53 sends a redirect message to the mobile station denying access to the requested control channel and redirecting the mobile station to a control channel associated with another base station. Although FIG. 2 depicts both MSCs with redirection logic, only one MSC is required to have the redirection logic in order to prevent a mobile station from another network from incorrectly accessing one of its base stations. However, in order for both networks to prevent their mobile stations from erroneously accessing control channels from another network, both MSCs must have the redirection logic. When only one MSC has redirection logic, only one network is protected from inadvertent access by a mobile station associated with another network. For example, if MSC-D has redirection logic, but MSC-C does not have redirection logic, MS 69 will be prevented from erroneously accessing base stations from Network D. However, if a mobile station associated with Network D wrongfully attempted access with a border base station from Network C, the MSC-C could not redirect the mobile station back to its own network. Therefore, in the preferred mode, both MSCs would have redirection logic. By both networks utilizing the redirection logic, both networks gain revenues for which they are each rightfully entitled.

Still referring to FIG. 2, the operation of the radio telecommunications system 31 will be explained. In an exemplary scenario, MS 69 is a mobile station whose home network is Network C. MS 69's location may vary throughout the radio telecommunications system 31. When MS 69 is operating near the border 71, but still within the Network C's coverage area, MS 69 may receive a stronger signal from one of the border base stations 55–61 within Network D, and therefore attempt access to one of the control channels associated with BSs 55–61. When MS 69 attempts access to a control channel associated with one of the border base stations 55–61, the associated MSC-D, through the redirection logic 53, recognizes that the MS 69's directory number is flagged, indicating that MS 69 is associated with the Network C. Next, the MSC-D determines whether the MS 69 is attempting to access a control channel associated with one of Network D's border base stations 55–61. If the MSC-D determines that MS 69 is attempting access to one of its border base stations, the MSC-D sends a redirect message to the MS 69. The redirect message includes a list of candidate control channels and instructs the MS to attempt access on a control channel from the list of candidate control channels. The list of candidate control channels, which may be as many as six in the preferred embodiment, includes candidate control channels associated with border base stations 37–43 within Network C, as well as candidate control channels associated with base stations located deeper within the coverage area of Network D, such as base stations 63–67. The MS 69 then attempts to access the control channel with the strongest signal among the candidate control channels.

If MS 69 is located near the border 71, but still within the physical coverage area of Network C, MS 69 will likely access a border base station associated with Network C, since the signal will be stronger than signals from the other base stations 63–67 located further within the coverage area of Network D.

In the situation where the MS 69 actually roams into the coverage area of Network D, the MS 69 will again attempt access with one of the border base stations 55–61 associated with the Network D. The MSC-D then recognizes that the MS 69 is associated with the Network C by determining that the MS 69's directory number is a flagged number from the MSC-D's database. The MSC-D then determines that the MS 69 is attempting access to one of its border base stations 55–61. The MSC-D sends a redirect message commanding the MS 69 to attempt access on a control channel from the list of candidate control channels. The MS 69 then attempts to access the control channel with the strongest signal from among the candidate control channels. If MS 69 has actually moved well within the coverage area of Network D, MS 69 will access one of the base stations located further within the coverage area of Network D, for example, one of the base stations 63–67. In this situation, MS 69 is actually within the coverage area of Network D and, therefore, should rightfully utilize Network D, thereby allowing Network D to collect revenue to which it is entitled.

Figure 3:
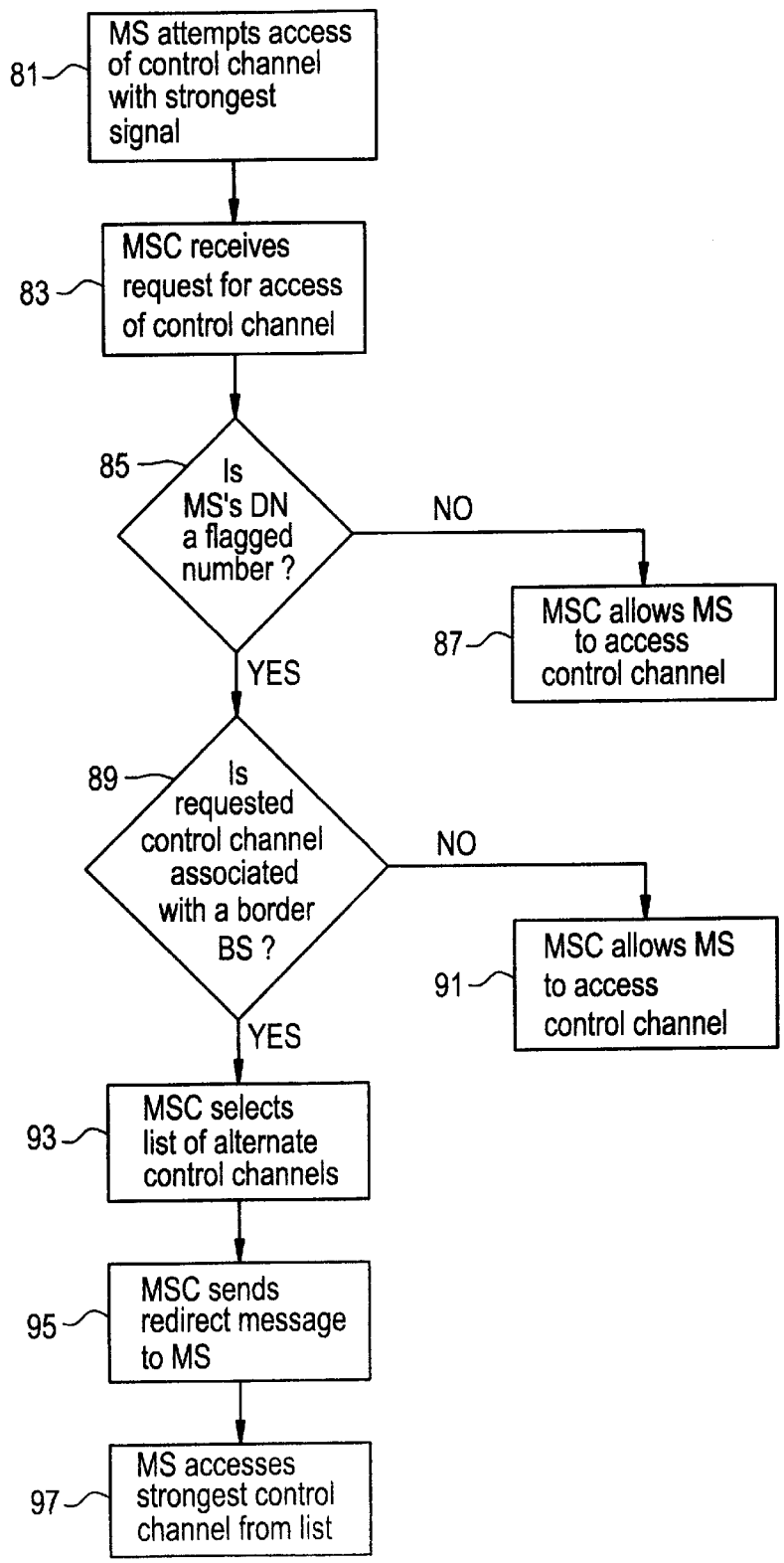
FIG. 3 is a flow chart outlining the steps of the method of selecting control channels near a border between two radio telecommunications networks according to the teachings of the present invention.

FIG. 3 is a flow chart outlining the steps of the method of selecting control channels near a border between two radio telecommunications networks according to the teachings of the present invention. Referring to FIGS. 2 and 3, the method will now be described. In step 81, the MS 69 originates a call within the radio telecommunications system 31. The MS 69 attempts to access a control channel with the strongest signal. Next, in step 83, an MSC, for example MSC-D, receives the request for access to the control channel associated with one of Network D's base stations (i.e., one of the base stations BS 55–67).

Next, in step 85, it is determined whether a directory number associated with the MS 69 is a flagged number. This is accomplished by the MSC-D storing all directory numbers associated with the Network C, the neighboring network, within the redirection logic 53. The list of flagged directory numbers may be indicated by a prefix found at the beginning of a mobile station's telephone number. If it is determined that the MS 69 is not associated with a flagged directory number, the method moves to step 87 where the MSC-D then allows the MS 69 to access the requested control channel with the strongest signal. For example, the MS 69 would not be associated with a flagged directory number if the MS 69 was from Network D or from a non-bordering network other than Network C. In such a situation, the MS 69 would be allowed to utilize the requested control channel.

However, if it is determined at step 85 that the MS 69 is associated with a flagged directory number, the method moves from step 85 to step 89 where the MSC-D, through the redirection logic 53, determines whether the control channel the MS 69 is attempting to use is associated with one of the border base stations of MSC-D (i.e., one of the base stations 55–61). If it is determined that the requested control channel is not associated with one of the border base stations (e.g., the MS 69 is attempting access with one of the base stations 63–67), the method moves to step 91 where the MSC-D allows the MS 69 to access the requested control channel. This would occur when the MS 69 was deep within the Network D's coverage area and there is no ambiguity as to which side of the border 71 the MS 69 is located.

However, if it is determined that the requested control channel is associated with a border BS (i.e., one of the base stations 55–61), the method moves from step 89 to step 93 where the MSC-D, through the redirection logic 53, selects a list of candidate control channels. The list, which may include as many as six numbers, includes control channels associated with base stations from border base stations within network C (BSs 37–43), as well as base stations located further within the network D, such as base stations 63–67.

Then, in step 95, the MSC-D sends a redirect message to the MS 69. The redirect message denies access to the requested control channel by the MS 69, sends the list of candidate control channels, as well as instructing the MS 69 to attempt access with one of the control channels on the list.

Next, in step 97, the MS 69 accesses one of the control channels from the candidate list with the strongest signal. If the MS 69 is actually still in the coverage area of the Network C, the MS 69 will likely access a control channel from one of the base stations located within the Network C. However, if the MS 69 has moved well within the coverage area of the Network D, MS 69 will likely access a control channel deeper within the coverage area of Network D, such as a control channel associated with one of the base stations 63–65.

The radio telecommunications system 31 offers several advantages over the existing system. When the MS 69 is located within the Network C's coverage area, the radio telecommunications system 31 prevents the inadvertent access of a base station from another network, such as Network D. However, if the MS 69 is actually located within the Network D's coverage area, the radio telecommunications system 31 will correctly allow the MS 69 to access a base station within the coverage area of Network D.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

What is claimed is:

1. A system for selecting a control channel for a mobile station (MS) operating near a border between a first radio telecommunications network and a second radio telecommunications network, said MS operating within a coverage area of the second radio telecommunications network, said system comprising:

a first mobile switching center (MSC) that services and controls a coverage area associated with said first radio telecommunications network;

a first plurality of base stations located within said first radio telecommunications network;

a second plurality of base stations located within said second radio telecommunications network;

means within said first MSC for determining whether the MS is attempting to improperly access a control channel from a base station in said first plurality of base stations while the MS is located within the coverage area of the second radio telecommunications network; and means for redirecting the MS to access a control channel from a base station of said second plurality of base stations, upon determining that the MS is attempting to improperly access a control channel from a base station of said first plurality of base stations.

2. The system for selecting a control channel for a MS of claim 1 wherein said means for determining if the MS is attempting to improperly access a control channel from a base station in the first plurality of base stations includes means for determining if the MS is attempting to access a base station in said first plurality of base stations which is adjacent to the border between the first radio telecommunications network and the second radio telecommunications network.

3. The system for selecting a control channel for a MS of claim 2 further comprising means for determining if the MS is associated with said second radio telecommunications network.

4. The system for selecting a control channel for an MS of claim 3 wherein said means for determining if the MS is associated with said second radio telecommunications network includes means for storing a list of directory numbers associated with mobile stations having said second radio telecommunications network as their home network.

5. The system for selecting a control channel for an MS of claim 4 wherein said means for redirecting the MS to access a control channel from a base station in said second plurality of base stations includes means for determining a plurality of alternate control channels, said plurality of alternate control channels including control channels from said second plurality of base stations.

6. The system for selecting a control channel for an MS of claim 5 wherein said means for redirecting the MS to access a control channel from a base station of said second plurality of base stations includes means for sending a redirect message to the MS, said redirect message including a list of said plurality of alternate control channels.

7. The system for selecting a control channel for an MS of claim 1 wherein said means for determining whether the MS is attempting to improperly access a control channel from a base station in said first plurality of base stations is a redirection logic function located within said first MSC.

8. The system for selecting a control channel for an MS of claim 7 further comprising:

a second MSC that services and controls a coverage area associated with said second radio telecommunications network;

means for determining whether a second MS which is associated with the first radio telecommunications network is attempting to improperly access a control channel from a base station in said second plurality of base stations while the second MS is located within the coverage area of the first radio telecommunications network; and means for redirecting the MS to access a control channel from a base station in said first plurality of base stations, upon determining that the MS is attempting to improperly access a control channel from a base station of said second plurality of base stations.

9. The system for selecting a control channel for a mobile station (MS) of claim 8 wherein said means for determining whether the second MS is attempting to improperly access a control channel from a base station of said second plurality of base stations includes means for determining if the second MS is attempting to access a base station in said second plurality of base stations which is adjacent to the border between the first radio telecommunications network and the second radio telecommunications network.

10. The system for selecting a control channel for a mobile station (MS) of claim 9 further comprising means for determining if the second MS is associated with said first radio telecommunications network.

11. The system for selecting a control channel for an MS of claim 10 wherein said means for determining if the second MS is associated with the first radio telecommunications network includes means for storing a list of directory numbers associated with mobile stations having said first radio telecommunications network as their home network.

12. The system for selecting a control channel for an MS of claim 11 wherein said means for redirecting the second MS to access a control channel from a base station of said first plurality of base stations includes means for determining a second plurality of alternate control channels, said alternate control channels including control channels from said first plurality of base stations.

13. The system for selecting a control channel for an MS of claim 12 wherein said means for redirecting the second MS to access a control channel from a base station of said first plurality of base stations includes means for sending a redirect message to the second MS, said redirect message including a second list of the second plurality of alternate control channels.

14. The system for selecting a control channel for an MS of claim 8 wherein said means for determining whether the second MS is attempting to improperly access a control channel from a base station of said second plurality of base stations is a redirection logic function located within said second MSC.

15. A method of selecting a control channel for a mobile station (MS) operating within a first radio telecommunications network along a border between the first radio telecommunications network and a second radio telecommunications network, said first radio telecommunications network having a first mobile switching center (MSC) and a first plurality of base stations, and the second radio telecommunications network having a second MSC and a second plurality of base stations, said method comprising the steps of:
   determining, by said second MSC, whether the MS is attempting to improperly access a control channel from one of the second plurality of base stations while the MS is located within the coverage area of the first radio telecommunications network; and
   redirecting by said second MSC, the MS to access a control channel from one of the first plurality of base stations, upon determining that the MS is attempting to improperly access a control channel from one of the second plurality of base stations.

16. The method of selecting a control channel for an MS of claim 15, wherein said step of determining by said second MSC, whether the MS is attempting to improperly access a control channel from one of the second plurality of base stations includes:
   determining by said second MSC, if the MS is associated with the first radio telecommunications network; and
   determining by the second MSC, if the MS is requesting a control channel from a base station in the second plurality of base stations which is adjacent to the border between the first radio telecommunications network and the second radio telecommunications network, upon determining that the MS is associated with the first radio telecommunications network.

17. The method of selecting a control channel for an MS of claim 16, wherein said step of redirecting by said second MSC, the MS to access a control channel from one of the first plurality of base stations includes:
   selecting by the second MSC, a list of alternate control channels, said list including control channels from the first plurality of base stations; and
   sending by the second MSC, a redirect message to the MS instructing the MS to access a control channel from the list of alternate control channels.

18. The method of selecting a control channel for an MS of claim 17, further comprising, after the step of sending by the second MSC, a redirect message to the MS, the step of accessing, by the MS, a control channel from the list of alternate control channels with the strongest signal.

19. A method of selecting a control channel for a mobile station (MS) operating within a first radio telecommunications network along a border between the first radio telecommunications network and a second radio telecommunications network, said first radio telecommunications network having a first mobile switching center (MSC) and a first plurality of base stations, and the second radio telecommunications network having a second MSC and a second plurality of base stations, said method comprising the steps of:
   attempting by said MS to improperly access a first control channel from one of the second plurality of base stations while the MS is located within the coverage area of the first radio telecommunications network;
   determining by the second MSC whether the MS is associated with the first radio telecommunications network;
   determining by the second MSC whether the first control channel is associated with a border base station which is adjacent to the border between the first radio telecommunications network and the second radio telecommunications network, upon determining that the MS is associated with the first radio telecommunications network;
   selecting by the second MSC a list of alternate control channels upon determining that the first control channel is associated with a border base station, said list including control channels from border base stations in the first radio telecommunications network and control channels from base stations in the second radio telecommunications network which are not border base stations; and
   sending a redirecting message from the second MSC to the MS, said redirect message including the list of alternate control channels and directing the MS to attempt to access one of the alternate control channels on the list.

20. A system for selecting a control channel for a mobile station (MS) operating along a border between a first radio telecommunications network and a second radio telecommunications network, said system comprising:
   a first mobile switching center (MSC) that services and controls a coverage area associated with the first radio telecommunications network;

a first plurality of base stations located within said first radio telecommunications network;

a second plurality of base stations located within said second radio telecommunications network;

means within said first MSC for storing a list of directory numbers associated with mobile stations having said second radio telecommunications network as their home network;

means for determining whether the MS is attempting to improperly access a base station which is adjacent to the border between the first radio telecommunications network and the second radio telecommunications network in said first plurality of base stations while the MS is located within the coverage area of the second radio telecommunications network;

means for determining a plurality of alternate control channels, said alternate control channels including control channels from said second plurality of base stations; and means for redirecting the MS to access a control channel from said plurality of alternate control channels.

* * * * *